Feb. 5, 1957     H. N. BROWN     2,780,495
IRRIGATION ATTACHMENT
Filed April 4, 1955
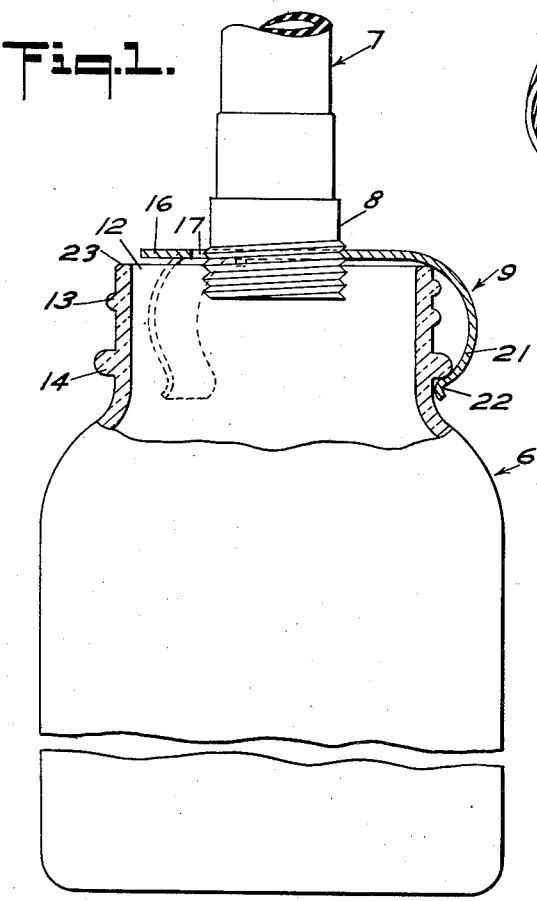
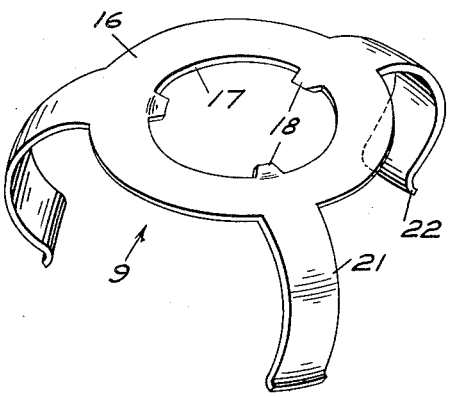
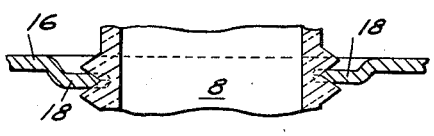
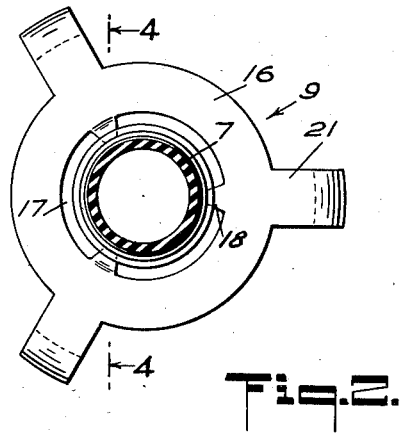
INVENTOR
HENRY N. BROWN
BY
ATTORNEYS United States Patent Office 2,780,495
Patented Feb. 5, 1957

2,780,495
IRRIGATION ATTACHMENT
Henry N. Brown, Oakland, Calif.
Application April 4, 1955, Serial No. 498,905
4 Claims. (Cl. 299—121)

The present invention relates to an improved attachment for water hoses to facilitate irrigating of flower beds, lawns, or the like, wherein it is desirable or necessary to prevent the impingement of high pressure streams of water upon the members being irrigated or the surrounding earth.

There is provided by the present invention an attachment of relatively large volume adapted to be secured to the end of a water hose in enveloping relation thereto for receiving a flow of water and reducing the velocity thereof and yet not limiting the volume of flow.

It is an object of the present invention to provide an improved irrigation attachment for water hoses and pipes.

It is another object of the present invention to provide an improved means for connecting a hose to a wide mouth jar to direct fluid flow through the jar.

A further object of the present invention is to provide novel means for interconnecting a hose and an open top jar whereby fluid may flow from the hose to the jar, and subsequently spill out of the latter.

Another object of the invention is to provide an irrigation attachment for water hoses that may be supported by the hose in elevated position over the ground to be irrigated.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing wherein:

Figure 1 is an elevational view of an irrigation attachment of the present invention.

Figure 2 is a top plan view of the connecting means for the irrigation attachment.

Figure 3 is a perspective view of the connecting means shown in Figure 2.

Figure 4 is a cross-sectional view taken substantially in the plane indicated by line 4—4 of Figure 2.

As hereinabove stated, the present invention relates to novel means for attaching a hose or other flexible conduit to an open top jar so that fluid, which may be under relatively high pressure, may be introduced into the jar. After the jar is full, it will be understood that so long as the jar remains in a substantially vertical position, the fluid entering the jar will be caused to spill over the upper peripheral edge of the jar at a substantially uniform, and greatly reduced pressure rate. Thus, by means of the present invention, it is possible to support such a jar over a flower bed which may be deleteriously affected by a direct impingement of water from a hose and merely permit a soaking of the ground as the water spills out of the upper top of the jar.

As seen in the drawing, the invention includes a jar generally designated by the numeral 6, a hose 7 having a conventional male coupling 8 at the distal end thereof, and connecting means 9 for interconnecting the hose coupling to the jar so that the hose is directed inwardly and generally centrally of the open end 12 of the jar. For reasons of economy, it is preferable to use substantially conventional glass jars, sometimes referred to as Mason jars, and in general such jars are provided with threads 13 adapted to receive a jar cover (not shown and comprising no part of the invention) and a lower lip 14 disposed below the lowermost thread. This lip is utilized in effecting the interconnection between the connecting means and jar as will be presently explained.

It is naturally desirable to have the distal end of the hose coupling 8 disposed within the open end of the jar and centrally of the threads 13 so that there will be little if any tendency for the water to be splashed out of one particular portion of the jar. Accordingly, the connecting means 9 insures a proper location of the hose coupling at all times. As will be seen in the drawing, the connector includes a generally annular ring 16 provided with a central opening 17 of substantially the same diameter as that of the hose coupling. Extending radially inwardly into the opening 17 are a plurality of tabs 18 which as best seen in Figure 4 lie in different vertical planes. These tabs, actually comprise threads for receiving the threaded end of coupling 8 and by means of such tabs it is possible to reduce the cost of manufacture of the connector by eliminating a complete threaded coupling member. Thus, in order to interconnect the connector and hose coupling, it is merely necessary to rotate one relative to the other until the tabs 18 become engaged with the threads on the coupling.

In order to secure the connector to the jar, once again it is possible to use a simple construction which will permit ready placing and removal of the connector from the jar, while at the same time effectively centering the hose relative to the jar mouth or top. As here shown, a plurality of resilient fingers 21 extend generally radially outwardly of the ring 16 and have a concave curvature as will best be seen in Figure 3. This permits the fingers to extend downwardly over the threads 13 of the jar and by means of a reverse curved portion 22 on the fingers, the latter may be resiliently snapped under the lip 14 of the jar. Thus, with the fingers all engaged in the above mentioned manner, the annular ring 16 will be axially aligned with the jar opening and consequently the hose will be directed along the axis of the jar.

While the connector is simple to construct and likewise simple to install on both jar and hose, it will be appreciated that after the interconnection has been effected, any water or other fluid flowing through the hose will enter the open top of the jar and will then be distributed uniformly over the upper peripheral edge 23 of the jar. This will, of course, materially reduce the impact force which would be created if the fluid flowing through the hose was permitted to directly engage the flower bed, lawn or the like. Likewise, due to the construction of the irrigation attachment, it is possible to hang the same by means of the hose in an elevated position over the ground to fulfil the necessary irrigation requirements, or, conversely, the jar may be placed directly on a portion of the ground. In any event, the simplicity and ease of operation of the present apparatus renders the same a vast improvement over irrigation devices heretofore available on the market.

Notice is also made of the non-restrictive nature of the opening for water egress whereby no back pressure is built up and whereby unlimited flow is made possible. Contrary to conventional apparatus of this general type, no baffling is employed, for such baffling materially limits flow volume and raises water pressure in the hose. Also, the present apparatus does not suffer loss of flow control at low volume flow as would be expected in the absence of baffles, for the normally upright position of the apparatus insures a relatively even flow distribution about the container circumference so that the flow is divided no matter how small.

What is claimed is:

1. Apparatus of the character described including a cylindrical container having an open top, connecting means for securing the coupling of a hose to said container comprising an annular ring adapted to overlie said open top, means extending radially outwardly from said ring for releasable engagement with said container adjacent the top thereof, and means on the inner peripheral surface of said annular ring adapted for releasable engagement with said hose coupling, said last means including a plurality of tabs extending radially inwardly from said annular ring and comprising portions of a continuous thread.

2. Irrigation apparatus for use with a hose having a male coupling at one end thereof, comprising: a substantially imperforate container having an open top and an outwardly disposed annular lip spaced downwardly from said top, a generally flat annular ring overlying said open top spaced radially inwardly of said lip and substantially coplanar with the upper surface thereof, a plurality of resilient fingers extending radially outwardly and downwardly from said ring and adapted to resiliently and releasably engage said container lip, and means extending radially inwardly from said ring adapted for releasable engagement to a hose coupling.

3. Apparatus as set forth in claim 2 in which said last named means includes a plurality of circumferentially spaced tabs, with said tabs lying in parallel offset planes.

4. Irrigation apparatus of the character described adapted for use with a hose having a male coupling at an end thereof, comprising: a container having an open top portion, means on the outer peripheral surface adjacent said top portion defining an annular lip, a substantially flat annular ring overlying said container top, integrally formed resilient fingers extending radially outwardly of said ring and having a reverse curved portion adapted to be seated subjacent said container lip for resiliently securing said ring to said container, and a plurality of circumferentially spaced and axially offset members extending radially inwardly from said ring adapted for engagement with a hose coupling.

References Cited in the file of this patent

UNITED STATES PATENTS

| | | |
|---|---|---|
| 2,037,145 | Palermo | Apr. 14, 1936 |
| 2,562,328 | Null | July 31, 1951 |